US011173416B2

(12) United States Patent
Bublies

(10) Patent No.: US 11,173,416 B2
(45) Date of Patent: Nov. 16, 2021

(54) SHORT-PATH EVAPORATOR

(71) Applicant: PILODIST GMBH, Meckenheim (DE)

(72) Inventor: Julian Alexander Bublies, Grafschaft (DE)

(73) Assignee: Julian Alexander Bublies, Grafschaft (DE)

( * ) Notice: Subject to any disclaimer, the term of this patent is extended or adjusted under 35 U.S.C. 154(b) by 0 days.

(21) Appl. No.: 16/821,622

(22) Filed: Mar. 17, 2020

(65) Prior Publication Data

US 2020/0306659 A1 Oct. 1, 2020

Related U.S. Application Data

(60) Provisional application No. 62/827,364, filed on Apr. 1, 2019.

(30) Foreign Application Priority Data

Mar. 29, 2019 (DE) ...................... 10 2019 108 212.9

(51) Int. Cl.
    *B01D 1/08*     (2006.01)
    *B01D 1/00*     (2006.01)
    *B01D 1/22*     (2006.01)

(52) U.S. Cl.
    CPC ............. *B01D 1/08* (2013.01); *B01D 1/0041* (2013.01); *B01D 1/0064* (2013.01); *B01D 1/223* (2013.01)

(58) Field of Classification Search
    CPC ...... B01D 1/0041; B01D 1/0064; B01D 1/08; B01D 1/223
    See application file for complete search history.

(56) References Cited

U.S. PATENT DOCUMENTS

| 2,546,381 A | * | 3/1951 | Zahm | ............... | B01D 1/225 |
| | | | | | 159/6.2 |
| 3,020,211 A | * | 2/1962 | Smith | ............... | B01D 1/225 |
| | | | | | 203/72 |

(Continued)

FOREIGN PATENT DOCUMENTS

| DE | 195 35 817 A1 | 4/1996 |
| DE | 100 24 418 A1 | 11/2001 |

(Continued)

OTHER PUBLICATIONS

Espacenet Machine Translation of DE 10024418A1 Obtained Mar. 24, 2021. (Year: 2021).*

*Primary Examiner* — Jonathan Miller
(74) *Attorney, Agent, or Firm* — Pauley Erickson & Swanson

(57) ABSTRACT

A short path evaporator including a heatable double-walled evaporator pipe having an inner interspace, with a rotatable rotor system disposed within the evaporator pipe and with a condenser disposed centrally in the evaporator pipe, and with an inlet for a product leading into the evaporator pipe, an outlet for a concentrate of the product leading out of the evaporator pipe, and an outlet for distillate accumulating at the condenser, and an inlet and an outlet for supplying and discharging heating medium to or from the interspace of the evaporator pipe, wherein the evaporator pipe is formed by an outer pipe and an inner pipe which, leaving the interspace, is disposed within the outer pipe, which are fixed at their ends in a sealing manner between two flange plates clamped together, wherein an inlet channel for the inlet of the product and an outlet channel for the outlet of the concentrate, which communicate with the interior of the inner pipe, are formed (Continued)

in the flange plates, as well as inlet and outlet channels for supplying and discharging the heating medium, which communicate with the interspace.

16 Claims, 3 Drawing Sheets

(56) References Cited

U.S. PATENT DOCUMENTS

| | | | | |
|---|---|---|---|---|
| 3,274,076 A * | 9/1966 | Watt | ............... | B01D 3/12 202/187 |
| 3,292,683 A * | 12/1966 | Buchi | ............... | B01D 1/223 159/6.2 |
| 3,695,327 A * | 10/1972 | Widmer | ............... | B01D 1/225 159/6.2 |
| 4,093,479 A * | 6/1978 | Baird | ............... | B01D 1/226 159/13.2 |
| 4,361,462 A * | 11/1982 | Fujii | ............... | B01D 1/226 159/6.2 |
| 6,627,047 B1 * | 9/2003 | Ijiri | ............... | B01D 1/225 159/13.1 |
| 7,422,663 B2 * | 9/2008 | Costa | ............... | B01D 1/26 202/174 |
| 8,034,217 B2 * | 10/2011 | Ito | ............... | B01D 1/221 202/186 |
| 8,858,758 B2 * | 10/2014 | Zebuhr | ............... | B01D 5/009 159/6.2 |
| 10,046,250 B2 * | 8/2018 | Zebuhr | ............... | C02F 1/041 |
| 10,384,145 B2 * | 8/2019 | Astoria | ............... | B01D 1/0064 |
| 10,821,414 B2 * | 11/2020 | Naef | ............... | B01D 1/225 |
| 2008/0230366 A1 * | 9/2008 | Ito | ............... | C12J 1/10 202/110 |
| 2015/0075967 A1 * | 3/2015 | Zebuhr | ............... | B01D 1/2893 203/11 |
| 2017/0106310 A1 * | 4/2017 | Astoria | ............... | B01D 1/225 |
| 2019/0247823 A1 * | 8/2019 | Naef | ............... | B01D 3/12 |

FOREIGN PATENT DOCUMENTS

| | | |
|---|---|---|
| DE | 100 24 420 A1 | 11/2001 |
| DE | 103 09 392 A1 | 9/2004 |
| EP | 3 150 264 A1 | 4/2017 |

* cited by examiner

SHORT-PATH EVAPORATOR

CROSS REFERENCE TO RELATED APPLICATIONS

This application claims the benefit of U.S. Provisional Patent Application Ser. No. 62/827,364, filed on 1 Apr. 2019. The Provisional Patent Application is hereby incorporated by reference herein in its entirety and is made a part hereof, including but not limited to those portions which specifically appear hereinafter.

BACKGROUND OF THE INVENTION

Field of the Invention

This invention relates to a short path evaporator, including a heatable double-walled evaporator pipe, which has an inner interspace, with a rotatable rotor system disposed within the evaporator pipe and with a condenser disposed centrally in the evaporator pipe, and with an inlet for a product leading into the evaporator pipe, an outlet for a concentrate of the product leading out of the evaporator pipe, an outlet for distillate accumulating at the condenser, and an inlet and an outlet for supplying and discharging heating medium to or from the interspace of the evaporator pipe.

Discussion of Related Art

Short path evaporator of the type mentioned above are known and used in various sizes for separating temperature-sensitive and high-boiling products without damaging them, such as when devolatilizing silicone oils, resins and polymers and concentrating omega-3 fatty acids or vitamin E. In recent times, short path evaporators have also gained particular importance, with the increased medical utilization of cannabis, as effective devices for obtaining the active substance cannabidiol (CBD), in respect of which reference is made to European Patent Reference EP 3 150 264 A1.

In the usually vertically disposed, double-walled evaporator pipe, which is heated with a heating medium, such as oil, the rotatable rotor system, by which wipers sweeping along the inner surface of the evaporator pipe, applies the supplied liquid product to the inner surface of the evaporator pipe in the form of a thin, highly turbulent film. Because of the film layer thickness being only small and due the large surface area, the product flows downwards under the action of gravity, during which the volatile portion of the product evaporates and deposits on the internal condenser. The non-evaporated product portion, the concentrate, which is often also referred to as residue or bottom, reaches the lower region of the evaporator pipe within a short time and there exits via an outlet for the concentrate. Because the short path evaporators are usually operated under a vacuum of 300 to 0.003 mbar abs. in the evaporator pipe, the evaporation temperature is lowered to such an extent that temperature-sensitive and high-boiling substances can be separated without any damage. Such a short path evaporator is known, for instance, from German Patent Reference DE 103 09 392 A1.

However, the problem with these short path evaporators is that, due to the tightness required for operation in a vacuum, they are often manufactured either as a welded stainless steel structure or in the form of a complex glass component, wherein at least the double-walled evaporator pipe is integrally manufactured together with the connection pieces for the inlet and outlet of the product, concentrate, distillate and heating medium, which, in the case of a stainless steel structure, entails a laborious welding process and, in the case of a glass structure, a glass blowing process that is no less laborious, requiring a considerable amount of working time and labor costs.

SUMMARY OF THE INVENTION

It is one object of this invention to provide a short path evaporator of the type mentioned above, which is characterized by a particularly simple structure that is easy to manufacture and assemble.

According to this invention, the configuration of a short path evaporator in accordance with the features described in this specification and in the claims is proposed for achieving this and other objects.

Advantageous embodiments and developments of this invention are also described in the dependent claims.

One solution according to this invention is that the evaporator pipe is formed by an outer pipe and an inner pipe which, leaving the interspace, is disposed within the outer pipe, which are fixed at their ends in a sealing manner between two flange plates clamped together, wherein an inlet channel for the inlet of the product and an outlet channel for the outlet of the concentrate, which communicate with the interior of the inner pipe, are formed in the flange plates, as well as inlet and outlet channels for supplying and discharging the heating medium, which communicate with the interspace.

For the production of the double-walled evaporator pipe, this invention thus uses two simple pipe sections, which are dimensioned so as to match each other, fitted into one another in order to form the inner and the outer pipe, and are fixed and sealed by flange plates provided at the two ends and clamped together. The channels for supplying and discharging the product or fractions, concentrate and distillate, deriving therefrom and the heating medium may be incorporated into the flange plates in a simple manner by bores, for example.

When using pipe sections of glass for the inner pipe and the outer pipe, a short path evaporator made with a glass design may be produced in a very simple manner, which enables good visual monitoring of the distillation process due to the transparency of the short path evaporator.

According to one embodiment of this invention, one flange plate includes the inlet channel for the inlet of the product and the outlet channel for discharging the heating medium, and the other flange plate includes the outlet channel for the outlet of the concentrate and the inlet channel for supplying the heating medium. In this case, the flange plate including the inlet channel for the inlet of the product is preferably arranged as the upper flange plate above the evaporator pipe, and the other flange plate including the outlet channel for the outlet of the concentrate is arranged as the lower flange plate underneath the evaporator pipe.

According to one embodiment of this invention, the flange plates, on the surfaces thereof facing towards the inner and outer pipes, are formed with grooves, into which a sealing ring is inserted that may be formed by corresponding O-rings, for example. The respective ends of the inner and outer pipes are inserted into these grooves, which are provided with a sealing ring, so that they are positively accommodated when the two flange plates are clamped together and compress the sealing ring in order to obtain a reliable sealing effect. This sealing effect both enables the evaporator pipe to be charged in a leakage-free manner with the product and the heating medium and the evacuation of the interior of the inner pipe, in which both the rotor and the condenser are disposed, which is required for carrying out the process within the short path evaporator.

According to one embodiment of this invention, the inlet and outlet channels formed in the flange plates are disposed so as to extend parallel to each other in the flange plates, so that a particularly homogeneous temperature regulation of the inlet and outlet channels of the product can be effected.

According to one embodiment of this invention, the inner and the outer pipe are each formed cylindrically, and the inner pipe is disposed concentrically within the outer pipe.

According to one embodiment of this invention, in order to be able to cause the rotor system to rotate for the purpose of forming a thin film of the product on the inner surface of the inner pipe, the preferably upper flange plate is formed with a through bore for a rotary drive unit of the rotor system.

According to one embodiment of this invention, the opposite, remaining flange plate, preferably the lower flange plate, is also be formed with a through bore through which the condenser passes.

On the side thereof facing away from the evaporator pipe, the flange plate, on the side thereof facing away from the evaporator pipe, may further be connected in a sealing manner to a bottom connection piece from which the condenser protrudes and projects through the through bore into the interior of the inner pipe.

The bottom connection piece can include a vacuum connection for evacuating the evaporator pipe and/or an outlet for the accumulating distillate.

Apart from manufacturing the inner and outer pipes from glass, they can also be made from other suitable materials, particularly stainless steel, but also other materials or plastics.

BRIEF DESCRIPTION OF THE DRAWINGS

This invention is explained below in more detail with reference to the drawing showing an exemplary embodiment, wherein.

DETAILED DESCRIPTION OF THE INVENTION

Figure 1:
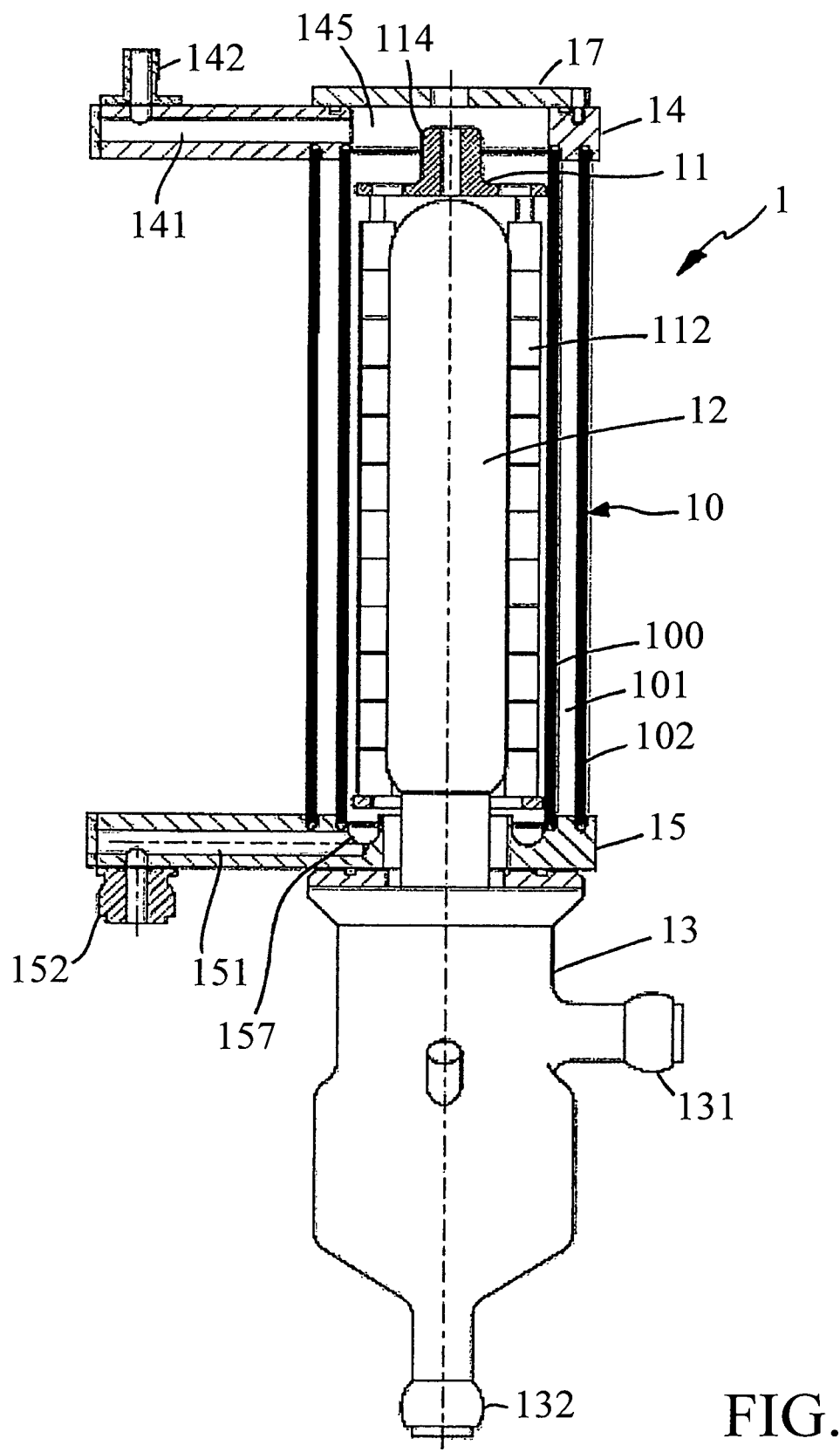
FIG. 1 shows a partial section taken through a short path evaporator according to this invention.

In FIG. 1, a short path evaporator 1, which can be used for the gentle distillation of organic products, is shown in a partial sectional view.

Figure 2:
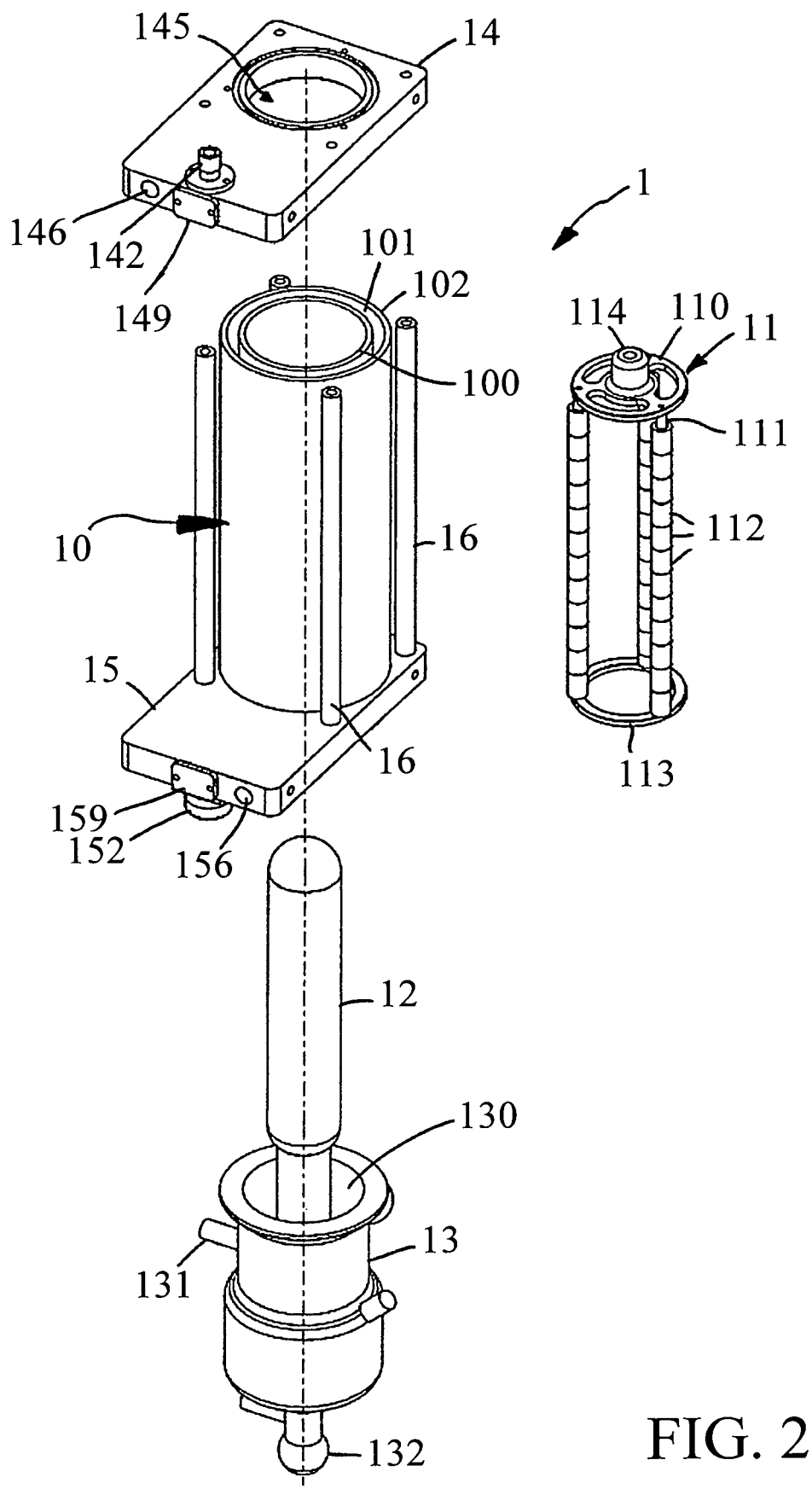
FIG. 2 shows the short path evaporator according to FIG. 1 in an exploded view.

As is also apparent in other details from the FIGS. 2-4, the short path evaporator 1 comprises, as an essential component, a vertically oriented evaporator pipe 10, which can be heated in a manner described in more detail below, and a rotor system 11, which is disposed within the evaporator pipe 10 and which can be driven to rotate about the vertical axis with a rotary drive not shown, and with a condenser 12, which is centrally disposed within the evaporator pipe 10 and within the rotor system 11, and which can be cooled in a manner not shown in any detail.

Such a short path evaporator 1 is based on a supplied liquid product, which is to be distillated, being spread in a thin layer onto the inner wall of the heated evaporator pipe 10 by the rotor 11, which is driven to rotate, wherein the highly volatile constituents of the product evaporate, due to the thin layer and the large surface area on the heated inner wall of the evaporator pipe 10, and deposit on the surface of the cooled condenser 12, whereas the remaining, higher-boiling portions of the product, following gravity, run down the inner wall of the evaporator pipe 10 and are removed as a concentrate. The accumulating distillate on the condenser 12 also runs down the latter and is removed separately. In order to support this distillation process, the interior of the evaporator pipe 10, in which the rotor 11 and the condenser 12 are disposed, is subjected to a negative pressure of, for example, 300 to 1 mbar abs, a so-called rough vacuum, or about 1 to 0.003 mbar abs, a so-called fine vacuum, whereby the evaporation temperature is lowered to the extent that even temperature-sensitive and high-boiling substances can be separated without any damage through distillation.

In order to provide the short path evaporator 1 with a structure that is particularly simple to manufacture and easy to assemble, the evaporator pipe 10 is formed by a cylindrical outer pipe 102 and an also cylindrical inner pipe 100 disposed concentrically within the former, between which a cylindrical interspace 101 is formed. The inner pipe 100 and the outer pipe 102 may be made, for example, from transparent glass in order to be able to easily observe the distillation process.

Figure 4:
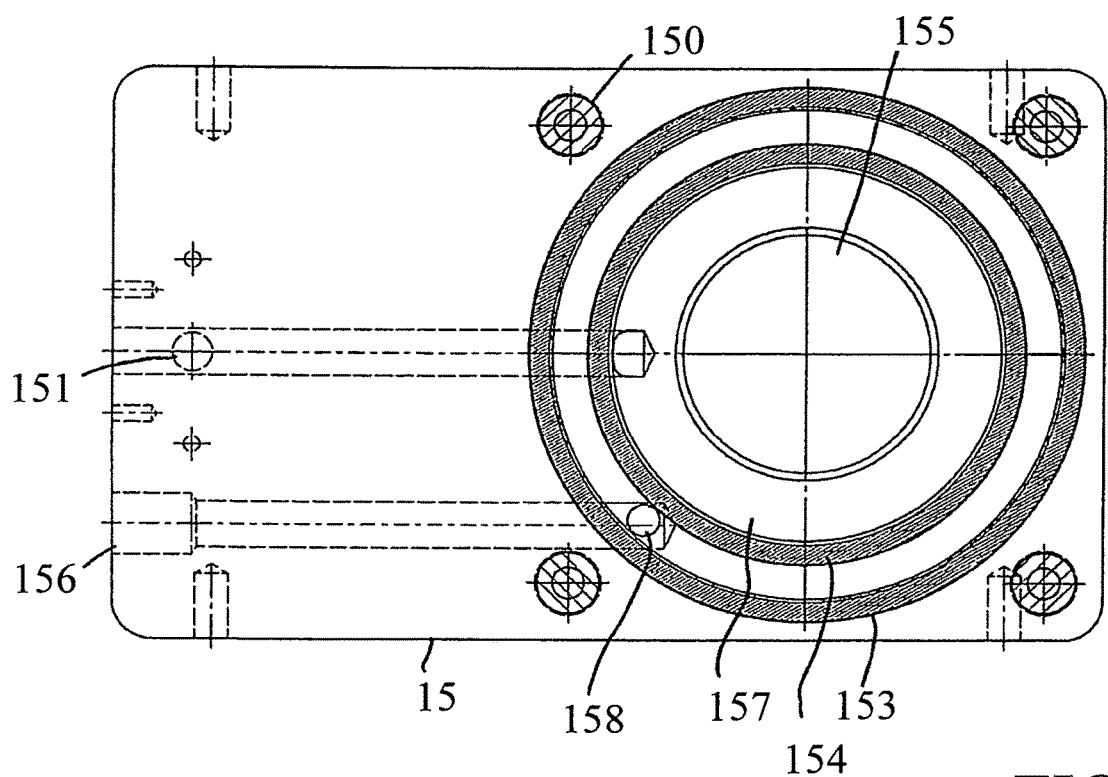
FIG. 4 shows the top view onto the lower flange plate according to FIG. 2, viewed from the evaporator pipe.

A lower flange plate 15, which is apparent in a more detailed manner from FIG. 4, is provided underneath the evaporator pipe 10 formed in this way. In order to accommodate the lower ends of the outer pipe 102 and the inner pipe 100, the flange plate 15, on the top side thereof, which is apparent from FIG. 4 and faces towards the evaporator pipe 10, has two correspondingly dimensioned, concentric grooves 153, 154, into each of which one compressible sealing ring is inserted. The groove 154 formed with the smaller diameter in this case accommodates the lower end of the inner pipe 100, and the groove 153 formed with the, in comparison, greater diameter accommodates the lower end of the outer pipe 102 in a positive and sealing manner. Further, the groove 154 delimits a collecting channel 147 disposed concentrically within, and a radially inwardly adjacent, central through bore 155 in the flange plate 15.

Figure 3:
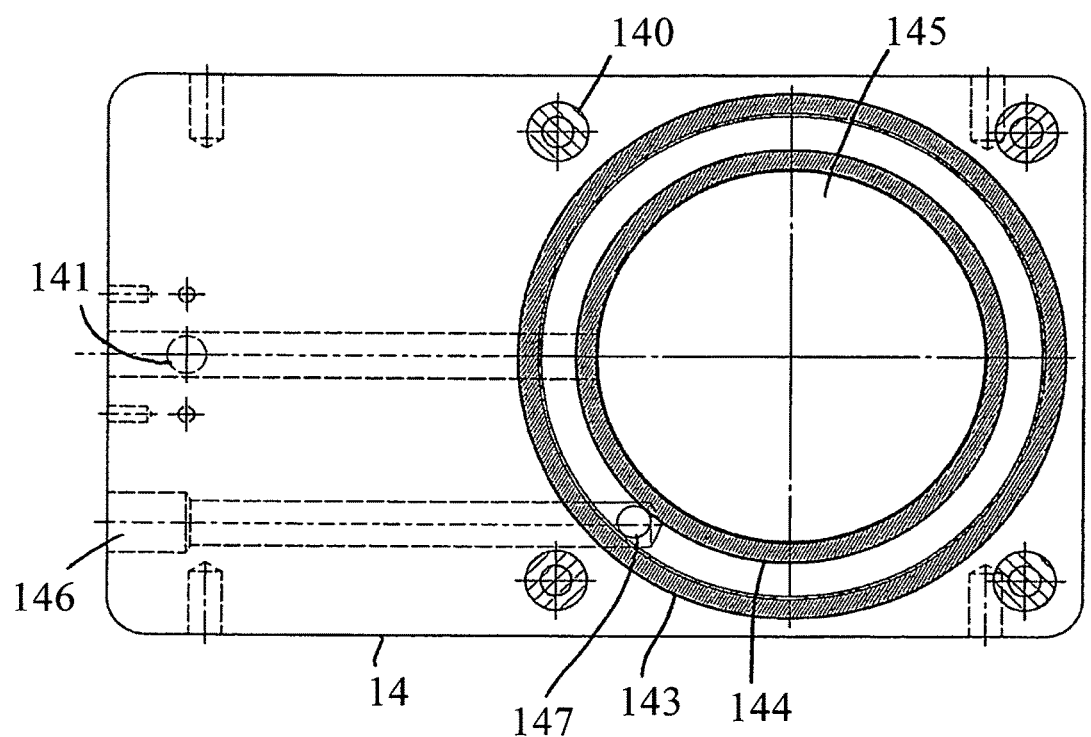
FIG. 3 shows the top view onto the upper flange plate according to FIG. 2, viewed from the evaporator pipe.

Likewise, an upper flange plate 14, which is apparent in a more detailed manner from FIG. 3, is provided above the evaporator pipe 10. This flange plate 14 also has on its underside, which is apparent from FIG. 3 and faces towards the evaporator pipe 10, corresponding concentric grooves 144, 143, which are formed with staggered diameters, with inserted sealing rings, wherein the groove 144 accommodates the upper end of the inner pipe 100 and the groove 143 accommodates the upper end of the outer pipe 102 in a positive and sealing manner. Furthermore, the groove 144 delimits a through bore 145 in the flange plate 14, which communicates with the interior of the inner pipe 100.

The two flange plates 14, 15 have the above-described grooves 143, 144, 153, 154 in an off-center position. In the illustration according to FIGS. 3 and 4, they are displaced towards the right-hand side from the center.

Furthermore, the two flange plates 14, 15, with the inner and outer pipes 100, 102 being interposed between them, are clamped together via clamping sleeves 16, which extend outside the outer pipe 102 and axially parallel thereto, and screws that are not shown and screwed into the clamping sleeves 16 via bores 140, 150 in the flange plates 14, 15, so that the inner pipe 100 and the outer pipe 102 are held firmly and in a sealed manner between the two flange plates 14, 15.

Several channels, which serve for feeding and draining the heating medium and the product and the concentrate obtained therefrom, are disposed within the flange plates 14, 15.

Thus, the upper flange plate 14 apparent from FIG. 3, starting from a vertically extending connection piece 142, has an inner channel bore extending on the central axis for forming an inlet channel 141 for the inlet of the product into the evaporator pipe 10. The bore formed from the left end face is later sealed by a cover 149 apparent from FIG. 2. The inlet channel 141 starting at the connection piece 142 radially leads into the through bore 145. In the assembled state apparent from FIG. 1, product supplied from there via the connection piece 142 and the inlet channel 141 arrives directly, via the through bore 145, in the interior of the inner pipe 100 and is seized there by the rotating rotor system 11 for forming a thin film on the inner surface of the inner pipe 100.

For driving the rotor system 11, the through bore 145 is sealed on its top by a screwed-on lid 17 which, however, has a central through bore for the engagement of a drive motor, which is not shown here, of the rotor system 11. In this case, the through bore is configured as a vacuum-tight sealed shaft feedthrough. Alternatively, configurations of the lid 17 not having a through bore are also possible, such as if a magnetic coupling for the drive of the rotor system 11 is used. The rotor system 11 itself comprises an upper rotor disk 110 with a coupling 114 for the drive motor formed on top, and a lower rotor disk 113, between which, for example, the three rotor axes 111 shown here extend axially parallel to the inner pipe 100, which carry a plurality of wiper members 112, which in the depicted exemplary embodiment are formed from polymer or graphite rollers, for example. When the rotor system 11 rotates about the central axis as shown in FIG. 1, the wiper members 112 sweep across the inner surface of the inner pipe 100 and continuously apply a thin film of the supplied product on this inner surface.

Parallel to the inlet channel 141 for the product described above, another channel 146 extends within the flange plate 14 which, in the illustration according to FIG. 3, leads out of the flange plate 14 at the left end face and, at its other end 147, is routed vertically downwards out of the flange plate 14 in the annular region between the two grooves 143, 144 in the direction towards the interspace 101 between the inner pipe 100 and the outer pipe 102, and communicates with the interspace 101. In a manner explained in more detail below, this channel 146 serves for discharging a heating medium.

In analogy to the configuration of the upper flange plate 14, the lower flange plate 15 according to the illustration shown in FIG. 4 also has an outlet channel 151, which extends on the central axis and is routed towards the outside via a connection piece 152 and which, at its end facing away from the connection piece 152, leads into the collecting channel 157 of the lower flange plate 15 via a corresponding opening. In the assembled state, the outlet channel 151 configured as a straight bore is also sealed by a cover plate 159 on the end face of the flange plate 15.

Parallel to the outlet channel 151, another channel 156 extends within the flange plate 15 which, in the illustration according to FIG. 4, is led out of the left end face of the flange plate 15 and, at its other end 158, is routed vertically upwards out of the flange plate 15 in the annular region between the two grooves 153, 154 in the direction towards the interspace 101 between the inner pipe 100 and the outer pipe 102, and communicates with the interspace 101.

It is thus possible, via the channel 156 serving as an inlet channel and the outlet opening 158, to feed a heating medium, such as heated oil, from the lower flange plate 15 into the interspace 101 between the inner pipe 100 and the outer pipe 102 and, given a corresponding recirculation, discharge it again from the interspace 101 of the evaporator pipe 10 via the opening 147 and the channel 146 in the upper flange plate 14 serving as an outlet channel. Thus, particularly the inner pipe 100 with its inner surface used for distillation can be effectively heated to the desired temperature.

In the manner already described, the product to be distilled is fed, via the connection piece 142 and the inlet channel 141 in the opposite direction starting from the upper flange plate 14, into the evaporator pipe 10, wherein the concentrate, which remains behind after the evaporation of the volatile constituents and which, following gravity, runs down the inner surface of the inner pipe 10, is collected in the collecting channel 157 of the lower flange plate 15 underneath the inner pipe 100 and can be removed from there via the outlet line 151 and the connection piece 152 in the flange plate 15.

In order to be able to collect in a manner known per se the constituents volatilized during the evaporation of the applied thin layer, the condenser 12, via the through bore 155 formed in the lower flange plate 15 within the collecting channel 157, is inserted from the underside of the evaporator pipe 10 into the central area of the latter, so that it comes to lie within the rotor system 11.

In this case, the condenser 12 is disposed in a vertically upwardly projecting manner on a bottom connection piece 13, which is attached in a sealing manner on the underside of the lower flange plate 15 facing away from the evaporator pipe 10. The bottom connection piece 13 is configured with connection pieces not shown in greater detail for supplying a refrigerant to the condenser 12 and, in addition, includes a vacuum connection 131 guided out laterally for connecting thereto a negative pressure source, by which the interior within the inner pipe 100 communicating with the connection piece 13 via the through bore 155 can be evacuated in the desired manner.

Furthermore, an annular free space around the condenser 12 remains in the region of the passage of the condenser 12 through the through bore 155 in the lower flange plate 15, so that the constituents of the product depositing and condensing on the condenser 12, following gravity, flow off as a distillate into the bottom connection piece 13 and can then be removed via distillate outlet 132 on the underside.

Therefore, the above-described short path evaporator 1 can be manufactured from easily manufactured standard components with little production expenditure and in high numbers, and permits the usual process for the distillation of organic products by film vaporization known per se.

It is clear that the inner pipe 100 and the outer pipe 102, instead of being manufactured from glass, may also be made from any other suitable materials, such as stainless steel or plastics.

German Patent Application DE 10 2019 108 212.9, filed 29 Mar. 2019, the priority document corresponding to this invention, to which a foreign priority benefit is claimed under Title 35, United States Code, Section 119, and its entire teachings are incorporated, by reference, into this specification.

What is claimed is:

1. A short path evaporator (1), comprising:
   a heatable double-walled evaporator pipe (10), the evaporator pipe (10) including a cylindrical outer pipe (102), a cylindrical inner pipe (100) disposed concentrically within the cylindrical outer pipe (102), and an inner interspace (101) between the cylindrical outer pipe (102) and the cylindrical inner pipe (100), two flange plates (14, 15), each of the two flange plates including one of a product inlet channel configured as an inlet of a product or a concentrate outlet channel configured as an outlet of a concentrate, wherein the product inlet channel and the concentrate outlet channel communicate with an interior of the inner pipe (100), and each of the two flange plates including one of a heating medium inlet channel configured to supply a heating medium to the interspace (101) or a heating medium outlet channel configured to discharge the heating medium from the interspace (101), wherein the two flange plates are clamped together onto opposing ends of the evaporator pipe (10), and each of the cylindrical outer pipe (102) and the cylindrical inner pipe (100) comprises a cylindrical pipe section fixed at each end in a sealing manner to one of the two flange plates (14, 15), a rotatable rotor system (11) disposed within the evaporator pipe (10), and a condenser (12) disposed centrally in the evaporator pipe (10).

2. The short path evaporator according to claim 1, wherein a first of the two flange plates includes the product inlet channel for the inlet of the product and the heating medium outlet channel for discharging the heating medium, and a second of the two flange plates includes the concentrate outlet channel for the outlet of the concentrate and the heating medium inlet channel for supplying the heating medium.

3. The short path evaporator (1) according to claim 2, wherein each of the two flange plates (14, 15), on a surface facing towards the inner and outer pipes (100, 102), includes grooves (143, 153, 144, 154), and each of the grooves accommodates an end of one of the inner and outer pipes (100, 102) and into which a sealing ring is inserted.

4. The short path evaporator (1) according to claim 3, wherein the product inlet channel, the heating medium outlet channel, the heating medium inlet channel, and the concentrate outlet channel formed in the two flange plates (14, 15) extend parallel to each other.

5. The short path evaporator (1) according to claim 4, wherein one of the two flange plates includes a through bore (145) for a rotary drive unit of the rotor system (11).

6. The short path evaporator (1) according to claim 5, wherein an other of the two flange plates includes a through bore (155) for the condenser (12).

7. The short path evaporator (1) according to claim 6, wherein the other of the two flange plates, on the side thereof facing away from the evaporator pipe (10), is connected in a sealing manner to a bottom connection piece (13) from which the condenser (12) protrudes.

8. The short path evaporator (1) according to claim 7, wherein the bottom connection piece (13) includes a vacuum connection (131) the or an outlet (131) for the accumulating distillate.

9. The short path evaporator (1) according to claim 8, wherein the inner pipe and the outer pipe (100, 102) are made from glass or stainless steel.

10. The short path evaporator (1) according to claim 1, wherein each of the two flange plates (14, 15), on a surface facing towards the inner and outer pipes (100, 102), includes grooves (143, 153, 144, 154), and each of the grooves accommodates an end of one of the inner and outer pipes (100, 102) and into which a sealing ring is inserted.

11. The short path evaporator (1) according to claim 1, wherein the product inlet channel, the heating medium outlet channel, the heating medium inlet channel, and the concentrate outlet channel formed in the flange plates (14, 15) extend parallel to each other.

12. The short path evaporator (1) according to claim 1, wherein one of the two flange plates includes a through bore (145) for a rotary drive unit of the rotor system (11).

13. The short path evaporator (1) according to claim 1, wherein one of the two flange plates includes a through bore (155) for the condenser (12).

14. The short path evaporator (1) according to claim 1, wherein one of the two flange plate, on the side thereof facing away from the evaporator pipe (10), is connected in a sealing manner to a bottom connection piece (13) from which the condenser (12) protrudes.

15. The short path evaporator (1) according to claim 14, wherein the bottom connection piece (13) includes a vacuum connection (131) or an outlet (131) for the accumulating distillate.

16. The short path evaporator (1) according to claim 1, wherein the inner pipe and the outer pipe (100, 102) are made from glass or stainless steel.

* * * * *